(12) United States Patent
Volent (10) Patent No.: US 9,274,535 B2
(45) Date of Patent: Mar. 1, 2016

(54) CURRENT TO VOLTAGE CONVERTER, ARRANGEMENT COMPRISING THE CONVERTER AND METHOD FOR CONVERTING AN INPUT CURRENT TO AN OUTPUT VOLTAGE

(75) Inventor: Kjetil Zsolt Volent, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 357 days.

(21) Appl. No.: 13/876,838

(22) PCT Filed: Feb. 4, 2011

(86) PCT No.: PCT/EP2011/051685
§ 371 (c)(1),
(2), (4) Date: Mar. 28, 2013

(87) PCT Pub. No.: WO2012/041530
PCT Pub. Date: Apr. 5, 2012

(65) Prior Publication Data
US 2013/0181694 A1    Jul. 18, 2013

(30) Foreign Application Priority Data
Sep. 29, 2010   (EP) .................................... 10182045

(51) Int. Cl.
*H02M 11/00*     (2006.01)
*G05F 1/46*      (2006.01)
*G01D 21/00*     (2006.01)

(52) U.S. Cl.
CPC . *G05F 1/46* (2013.01); *G01D 21/00* (2013.01)

(58) Field of Classification Search
CPC .................................. G05F 1/46; G05F 1/561
USPC ................................................. 327/103, 509
See application file for complete search history.

(56) References Cited

U.S. PATENT DOCUMENTS

| 5,306,955 A | * | 4/1994 | Fryer | ............................. 307/116 |
| 5,638,262 A | | 6/1997 | Brown | ............................. 363/19 |

(Continued)

FOREIGN PATENT DOCUMENTS

| CN | 101501453 A | 8/2009 | ............... G01D 3/08 |
| EP | 0262659 A2 | 4/1988 | ............. G08C 19/02 |

(Continued)

OTHER PUBLICATIONS

Chinese Office Action, Application No. 201180047304.8, 11 pages, May 14, 2014.

(Continued)

*Primary Examiner* — William Hernandez
(74) *Attorney, Agent, or Firm* — Slayden Grubert Beard PLLC (57) ABSTRACT

A converter for converting an input current to an output voltage may include: a first region; a second region galvanically separated from the first region; an input reference node in the first region, wherein the converter allows a flow of the input current through a device to the input reference node; a circuitry for generating, based on the input current, the output voltage relative to an output reference electric potential, the circuitry including a voltage transfer component for transferring the output voltage from the first region to the second region, wherein the voltage transfer component comprises a first circuit in the first region and a second circuit in the second region, wherein the first circuit is driven by a first electric supply voltage relative to a first supply reference potential; and an output terminal, located in the second region and connected to the second circuit, for outputting the output voltage.

17 Claims, 2 Drawing Sheets

(56) References Cited

U.S. PATENT DOCUMENTS

| | | | |
|---|---|---|---|
| 8,089,386 B2 | 1/2012 | Konrad et al. | 341/155 |
| 2009/0303090 A1 | 12/2009 | Korn et al. | 341/110 |
| 2010/0195254 A1 | 8/2010 | Cohen et al. | 361/18 |

FOREIGN PATENT DOCUMENTS

| | | | |
|---|---|---|---|
| EP | 1096652 A1 | 5/2001 | H02H 7/12 |
| JP | 62064804 A | 3/1987 | C08C 19/00 |
| JP | 63106898 A | 5/1988 | G08C 19/02 |
| JP | 6064176 A | 3/1994 | B41J 2/16 |
| WO | 2012/041530 A1 | 4/2012 | G08C 19/02 |

OTHER PUBLICATIONS

Harrold, Dave, "4-20 mA Transmitters Alive and Kicking," Control Engineering, Reed Business Information, vol. 45, No. 13, 6 pages, Oct. 1998.

International Search Report and International Preliminary Report on Patentability, Application No. PCT/EP2011/051685, 10 pages, Jun. 7, 2011.

* cited by examiner

CURRENT TO VOLTAGE CONVERTER, ARRANGEMENT COMPRISING THE CONVERTER AND METHOD FOR CONVERTING AN INPUT CURRENT TO AN OUTPUT VOLTAGE

CROSS-REFERENCE TO RELATED APPLICATIONS

This application is a U.S. National Stage application of International Application No. PCT/EP2011/051685 filed Feb. 4, 2011, which designates the United States of America, and claims priority to EP Patent Application No. 10182045.4 filed Sep. 29, 2010 The contents of which are hereby incorporated by reference in their entirety.

TECHNICAL FIELD

The present disclosure relates to a converter and to a method for converting an input current to an output voltage and to an arrangement comprising a measuring device, the converter, and a control system. For example, the present disclosure relates to a receiver, e.g., a current loop receiver, e.g., a 4 mA to 20 mA current loop receiver, to an arrangement comprising such a current loop receiver, and to a method for converting an input current to an output voltage using such a current loop receiver.

BACKGROUND

Particular measuring devices, such as measuring devices for measuring a pressure and/or a temperature, provide an electric current indicative of a measurement value of a physical quantity, such as a temperature and/or a pressure. At the same time the measuring device may be supplied with electric energy using the current loop. Thus, only two wires are required to supply the electric measuring device with electric energy and to obtain the current value indicative of the measurement value of the physical quantity. Thus, only two wires are required to on one hand provide electrical power to the measuring device and to on the other hand obtain the measurement values. A particular class of measurement devices, also called 4 mA to 20 mA field transmitter, provides an electric current in the range between 4 mA and 20 mA depending on the measurement value.

To further process and/or analyze the measurement values being represented by the electric current flowing through the measurement device, it may be necessary to transform or convert the current signal representing the measurement value to an analogous or digital voltage signal. Thereby, in the prior art, so-called 4 mA to 20 mA current loop receivers are employed which comprise an electric power supply providing a positive voltage relative to a ground potential and a negative voltage relative to a ground potential. However, it has been observed that the current loop receivers according to the prior art are very voluminous, heavy and difficult to integrate into a compact device.

There may be a need for a converter and for a method for converting an input current to an output voltage and for an arrangement comprising the converter. In particular, there may be a need for a converter and a method for converting an input current to an output voltage, wherein the converter is compact, lightweight and easy to integrate. Further, there may be a need for a converter and a method for converting an input current to an output voltage, wherein components connected to the converter are independent of each other, such that a failure of one of these components does not affect another of these components.

SUMMARY

One embodiment provides a converter for converting an input current to an output voltage, the converter comprising: a first region; a second region galvanically separated from the first region; an input reference node in the first region, wherein the converter is adapted to allow a flow of the input current through a device to the input reference node; a circuitry for generating, based on the input current, the output voltage relative to an output reference electric potential, wherein the circuitry comprises a voltage transfer component for transferring the output voltage from the first region to the second region, wherein the voltage transfer component comprises a first circuit in the first region and a second circuit in the second region, wherein the first circuit is adapted to be driven by a first electric supply voltage relative to a first supply reference potential; and an output terminal, located in the second region and connected to the second circuit, for outputting the output voltage.

In a further embodiment, the first supply reference potential is a ground potential.

In a further embodiment, the converter further comprises an electric power provider for providing the first electric supply voltage relative to the first supply reference potential for driving the first circuit; and a power input terminal in the second region, wherein the electric power provider is adapted to receive electrical energy via the power input terminal.

In a further embodiment, the electric power provider is a DC power provider.

In a further embodiment, the electric power provider comprises a first power provider portion in the first region and a second power provider portion in the second region, wherein the first power provider portion is inductively and/or capacitively coupled to the second power provider portion.

In a further embodiment, the second power provider portion is adapted to receive the electrical energy via the power input terminal and wherein the first power provider portion and the second power provider portion are adapted to transfer the electrical energy from the second power provider portion to the first power provider portion.

In a further embodiment, the second circuit is adapted to receive electric power via the power input terminal, wherein the electric power is supplied employing a second electric supply voltage relative to a second supply reference potential, e.g., a ground potential.

In a further embodiment, the second circuit is inductively, optically and/or capacitively coupled to the first circuit.

In a further embodiment, the converter is adapted to supply electric energy to the device and convert the input current in a predetermined input current range, e.g., between 0 mA and 20 mA, to an output voltage in a predetermined output voltage range, e.g., between 0 V and 5 V, relative to the output reference electric potential, e.g., relative to a ground potential.

In a further embodiment, the converter further comprises a first input terminal and a second input terminal for connecting the device between the first input terminal and the second input terminal, wherein the first input terminal and the second input terminal are located in the first region, wherein the first input terminal and the second input terminal allow a flow of the input current from the first input terminal through the device to the second input terminal and from the second input terminal to the input reference node.

In a further embodiment, the converter further comprises a shunt resistor connected between the second input terminal and the input reference node, wherein the output voltage is based on a voltage drop across the shunt resistor upon flow of the input current through the shunt resistor.

In a further embodiment, the converter further comprises a first amplifier to amplify the voltage drop to a preliminary output voltage, wherein the output voltage is based on the preliminary output voltage.

In a further embodiment, the converter further comprises a second amplifier to generate the output voltage based on the preliminary output voltage, wherein the second amplifier is adapted to generate the output voltage such that the output voltage is zero, if the input current has a predetermined current value, e.g., a current value of 4 mA, and wherein the second amplifier is, e.g., adapted to generate the output voltage to be proportional to a difference of the input current and the predetermined current value.

Another embodiment provides an arrangement, comprising: a measuring device providing an electric current based on a measuring value of a physical quantity, e.g., a temperature and/or a pressure; a converter as disclosed above, wherein the input current is allowed to flow through the measuring device to the input reference node, wherein the measuring device is, for example, connected between the first input terminal and the second input terminal; and a control system for supplying electric energy to the converter, e.g., via the power input terminal, and receiving the output voltage from the converter via the output terminal.

Another embodiment provides a method for converting an input current to an output voltage, the method comprising: allowing a flow of the input current through the device to an input reference node located in a first region; generating, based on the input current, an output voltage relative to an output reference electric potential; transferring the output voltage from the first region to a second region using a voltage transfer component, wherein the second region is galvanically separated from the first region, wherein the voltage transfer component comprises a first circuit in the first region and a second circuit in the second region; driving the first circuit by a first electric supply voltage relative to a first supply reference potential; and outputting the output voltage at an output terminal located in the second region and connected to the second circuit.

BRIEF DESCRIPTION OF THE DRAWINGS

Exemplary embodiments will be explained in more detail below on the basis of the schematic drawings, wherein.

DETAILED DESCRIPTION

According to an embodiment, a converter (such as a receiver, e.g., a current loop receiver, e.g., a 4 mA to 20 mA current loop receiver) for converting (or transforming) an input current (an electrical input current, e.g., a DC input current) to an output voltage (relative to an output reference electric potential, such as a ground potential) is provided, wherein the converter comprises a first region (comprising one or more electric or electronic components); a second region galvanically separated from the first region; an input reference node (e.g., an electrical input reference node, such as an electric terminal) in the first region (such that the input reference node is galvanically separated from the second region), wherein the converter is adapted to allow a flow of the input current (via which the device may be supplied with electric energy) through a device (such as a measuring device, e.g., a measuring device providing an electric current indicative of a measurement value measuring a physical quantity, such as a temperature and/or a pressure, e.g., a 4 mA to 20 mA field transmitter) to the input reference node (e.g., the input current flowing through the device may be indicative of the measurement value such that the input current supplies the electric device or the measurement device with electric energy and the amount of the current or the value of the current is indicative of the measurement signal indicating a particular value of the measured physical quantity); a circuitry (comprising one or more electric and/or electronic components, such as a resistor, an amplifier, an operational amplifier, a diode, a transformer, a capacitor, an electric coil and/or other components) for generating, based on the input current (such that the output voltage may depend on the input current, e.g., such that the output voltage increases with increasing input current), an output voltage relative to an output reference electric potential (such as for example a ground potential), wherein the circuitry comprises a voltage transfer component (e.g., comprising one or more elements for inductively, capacitively and/or optically coupling the first region with the second region) for transferring (or transmitting) the output voltage from the first region to the second region, wherein the voltage transfer component comprises a first circuit (e.g., comprising one or more electric or electronic components, such as an electric coil, a light source and/or a capacitor plate) in the first region and a second circuit (e.g., comprising one or more electric and/or electronic components, such as an electric coil, a photodiode, a sensor, and/or a capacitor plate) in the second region, wherein the first circuit is adapted to be driven (such as to be supplied with electric energy for properly operating the first circuit) by a first electric supply voltage (such as for example either a positive voltage or a negative voltage relative to the first supply reference potential) relative to a first supply reference potential (which may be, e.g., a fixed potential, such as an earth potential or a ground potential); and an output terminal, located in the second region and connected to the second circuit, for outputting the output voltage.

For example, electric and/or electronic components located within the first region are galvanically separated from electronic and/or electric components located within the second region. For example, no electric current may flow from any component located within the first region to any component located within the second region. Thus, any failure occurring either on the components located in the first region or components located in the second region may not affect in any way components or elements in the respective other region. Thereby, a reliability of using the converter may be improved. Further, any components or systems connected to the converter at the first region may not be affected by components connected to the converter at the second region and vice versa. Thereby, any components connected to either region of the converter may be protected from an influence of (potentially failing) components connected to the respective other region. Thereby, damage or failure of components connected to the converter may be reduced.

The first circuit located within the first region may be adapted (together with the second circuit) to transfer the output voltage from the first region to the second region, e.g., by optical, capacitive and/or inductive coupling between the first circuit and the second circuit.

For driving the first circuit such that it properly operates, the first circuit does not require a supply voltage that is formed by a positive voltage portion relative to the ground potential and a negative portion of the voltage relative to the ground potential. Instead, the first circuit properly operates by supplying the first electric supply voltage relative to the first supply reference potential (such as the ground potential), wherein the first electric supply voltage may be a positive voltage relative to the first supply reference potential or wherein the first electric supply voltage may be a negative voltage relative to the first supply reference potential. Thereby, driving the first circuit, i.e. supplying the first circuit with electric energy, may be simplified. For example, only a so-called single-polarity power supply is required which provides the first electric supply voltage relative to a first supply reference potential but which does not supply both a negative voltage and a positive voltage relative to the first supply reference potential. Thereby, the converter may be constructed in a compact manner, and e.g., being lightweight compared to a converter known from the prior art.

For example, the first circuit and the second circuit may together form a so-called galvanic isolation part within the converter for galvanically isolating the first region from the second region.

For example, the output voltage may lie within a range between 0 V and 10 V, e.g., between 0 V and 5 V. For example, the input current may lie within a range between 4 mA and 20 mA.

According to an embodiment, the first supply reference potential is a ground potential (or earth potential). For example, the first electric supply voltage may be a positive voltage relative to the ground potential or in other embodiments the first electric supply voltage may be a negative voltage relative to the ground potential. For example, the first electric supply voltage may be between 10 V and 50 V, e.g., between 20 V and 30 V.

Thereby, the converter may be constructed in a simple, cost-effective, and lightweight manner.

According to an embodiment, the converter further comprises an electric power provider (which may not by itself generate electric energy but may only provide or mediate electric power to one or more components of the converter) for providing the first electric supply voltage relative to the first supply reference potential for driving the first circuit (e.g., the electric power provider may drive one or more other components of the converters, such as an amplifier, an operational amplifier or other components, e.g., in the first region); and a power input terminal in the second region, wherein the electric power provider is adapted to receive electrical energy via the power input terminal.

For example, for operating the converter no other electric power provider may be necessary. For example, the electric power provider may be a single-polarity power supply provision, which provides for example a positive voltage relative to the first supply reference potential or which provides in alternative embodiments a negative voltage relative to the first supply reference potential, but which may not generate a voltage between a negative voltage relative to the first supply reference potential and a positive voltage relative to the first supply reference potential. Thereby, the electric power provider may be constructed in a simple, compact, and lightweight manner compared to an electric power provider known from the prior art.

According to an embodiment, the electric power provider is a DC power provider. Thus, the power provider may provide direct current electric energy. For example, also the power input terminal may receive a direct current energy stream or energy signal, e.g., from an external device. For example, the electric power provider may provide the first electric supply voltage between 20 V and 30 V relative to a ground potential, or may provide the first electric supply voltage between −20 V and −30 V relative to the ground potential. For example, the electric power provider may be constructed such that the electric power provider may provide the first electric supply voltage in a range such that the first circuit (and/or other components of the converter) may be driven or supplied with electric energy in an optimized way.

According to an embodiment, the electric power provider comprises a first power provider portion (for example comprising an electric coil, such as a wound wire) in the first region and a second provider portion (such as electric coil, such as a wound wire) in the second region, wherein the first power provider portion is inductively and/or capacitively coupled to the second power provider portion. By the inductive and/or capacitive coupling the second provider portion may transfer the electric energy received via the power input terminal to the first power provider portion. Further, electric wires may connect the first power provider portion with the first circuit for supplying electric power to the first circuit.

According to an embodiment, the second power provider portion is adapted to receive the electrical energy via the power input terminal, wherein the first power provider portion and the second power provider portion are adapted to transfer the electrical energy from the second power provider portion to the first power provider portion. By galvanically isolating the first power provider portion from the second power provider portion an influence of components connected to the first region or the second region of the converter may be reduced, such that a failure or malfunction of a component connected to the first region may not affect a component connected to the second region and vice versa.

According to an embodiment, the second circuit is adapted to receive electric power via the power input terminal, wherein the electric power is supplied employing a second electric supply voltage relative to a second supply reference potential, e.g., a ground potential. For example, the second circuit may not require an energy supply employing a voltage between a positive voltage and a negative voltage, both the positive voltage and the negative voltage being measured relative to the ground potential. Thereby, also the energy supply for the second circuit may be simplified, reducing a size, and/or weight of the converter.

According to an embodiment, the second circuit is inductively (for example using one or more coils, such as wound wires), optically (e.g., using one or more light sources and one or more light receivers, such as photodiodes) and/or capacitively (for example by using one or more capacitor plates being placed opposite to each other, each capacitor plate being located in one of the first region and the second region, wherein the capacitor plates are located in different regions) coupled to the first circuit. Thereby, an effective galvanic separation or galvanic isolation between the first region and the second region may be achieved.

According to an embodiment, the converter is adapted to supply electric energy to the device (e.g., using the input current flow) and to convert the input current which is in a predetermined input current range, e.g., between 0 mA and 20 mA, to an output voltage in a predetermined output voltage range, e.g., between 0 V and 5 V, relative to the output reference electric potential, e.g., relative to a ground potential.

Thereby, a 4 mA to 20 mA current loop receiver may be provided which may be adapted to convert the input current provided by a 4 mA to 20 mA field transmitter to an analog or digital output voltage.

According to an embodiment, the converter comprises an analog-to-digital converter for providing a digital output voltage signal. In other embodiments, the converter may provide an analog output voltage within the predetermined output voltage range.

According to an embodiment, the converter further comprises a first input terminal and a second input terminal for connecting the device between the first input terminal and the second input terminal, wherein the first input terminal and the second input terminal are both located in the first region, wherein the first input terminal and the second input terminal allow the flow of the input current from the first input terminal through the device to the second input terminal and from the second input terminal to the first reference node.

For example, the first input terminal may be connected to the electric power provider, such that the electric power provider provides the first electric supply voltage to the first terminal. For example, the input reference node may be connected to a ground potential. For example, the first electric supply voltage applied at the first input terminal may cause (at least) a standby current to flow through the device connected between the first input terminal and the second input terminal. Upon measuring the physical quantity the input current flowing from the first input terminal through the device to the second input terminal may increase, e.g., proportional to a measurement value measuring the physical quantity. Thereby, by monitoring the current flowing through the device to the input reference node a value of the measured physical quantity may be derived.

According to an embodiment, the converter further comprises a shunt resistor (a resistive element having an impedance, wherein current and voltage may be in phase) connected between the second input terminal and the input reference node (such that the input current flowing through the device also flows through the shunt resistor), wherein the output voltage is based on a voltage drop (e.g., a decrease of the voltage from one terminal of the shunt resistor to the other terminal of the shunt resistor) across the shunt resistor upon flow of the input current through the shunt resistor. Thereby, a voltage drop indicative of the input current (e.g., a value or an amount of the input current) may easily be obtained.

According to an embodiment, the converter further comprises a first amplifier to amplify the voltage drop to a preliminary output voltage, wherein the output voltage is based on the preliminary output voltage. For example, the converter may comprise one or more amplifiers, e.g., in a staggered configuration and/or forming one or more amplification stages. For example, the first amplifier (or any other of the amplifiers) may comprise one or more semiconductor components, such as one or more transistors, resistors, coils, capacitors and the like. For example, the preliminary output voltage may comprise a portion corresponding to the standby current, wherein this portion of the preliminary output voltage may not correspond to a measurement value of the physical quantity, but this portion of the preliminary output voltage may represent a voltage offset.

According to an embodiment, the converter further comprises a second amplifier (e.g., also comprising one or more electric or electronic components, such as transistors, capacitors, coils, resistors and the like) to generate the output voltage based on the preliminary output voltage (such that for example the preliminary output voltage may be an input voltage for the second amplifier and the output voltage may be an output of the second amplifier), wherein the second amplifier is adapted to generate the output voltage such that the output voltage is zero, if the input current has a predetermined current value, e.g., a current value of 4 mA, and wherein the second amplifier is, e.g., adapted to generate the output voltage to be proportional to a difference of the input current and the predetermined current value. For example, the difference of the input current and the predetermined current value may represent a quantity proportional to the value of the measured physical quantity, which has been measured by the device connected between the first input terminal and the second input terminal of the converter. For example, the output voltage may not any more comprise the voltage offset. According to an embodiment, the output voltage is proportional to a value of the quantity measured by the device connected between the first input terminal and the second input terminal.

For example, according to an embodiment, the first amplifier and/or the second amplifier may be supplied with electric energy only employing the first electric supply voltage relative to the first supply reference potential. Thus, e.g., the first amplifier and/or the second amplifier may be supplied with electric energy using the electric power provider.

According to an embodiment, an arrangement (such as a subsea arrangement, a topside arrangement, an oil bore site arrangement or the like) is provided, wherein the arrangement comprises a measuring device providing an electric current based on a measuring value of a physical quantity, e.g., a temperature and/or a pressure; a converter according to one of the above-described embodiments, wherein the input current is allowed to flow through the measuring device to the input reference node, wherein the measuring device is, e.g., connected between the first input terminal and the second input terminal; and a control system for supplying electric energy to the converter, e.g., via the power input terminal, and for receiving the output voltage from the converter via the output terminal.

For example, the control system is galvanically separated or isolated from the measuring device such that any failure occurring at anyone of the control system and the measuring device may not affect the operation or constitution of the respective other one of the control system and the measuring device. The arrangement may for example be employed for a power plant, such as a water power plant, for a pipeline, for an oil bore site or a gas production site.

It should be understood that features (individually or in any combination) disclosed, described, explained, employed or applied to a converter for converting an input current to an output voltage may also (individually or in any combination) be applied to, employed and/or used for a method for converting an input current to an output voltage and vice versa.

According to an embodiment, a method for converting an input current to an output voltage is provided, wherein the method comprises allowing a flow of the input current through the device to an input reference node located in a first region; generating, based on the input current, an output voltage relative to an output reference electric potential; transferring the output voltage from the first region to a second region using a voltage transfer component, wherein the second region is galvanically separated from the first region, wherein the voltage transfer component comprises a first circuit in the first region and a second circuit in the second region; driving the first circuit by a first electric supply voltage relative to a first supply reference potential; and outputting the output voltage at an output terminal located in the second region and connected to the second circuit.

It has to be noted that various embodiments have been described with reference to different subject matters. For example, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, e.g., between features of the method type claims and features of the apparatus type claims is considered as to be disclosed with this document.

The illustration in the drawings is in schematic form. It is noted that in different figures, similar or identical elements are provided with the same reference signs or with reference signs, which are different from the corresponding reference signs only within the first digit.

Figure 1:
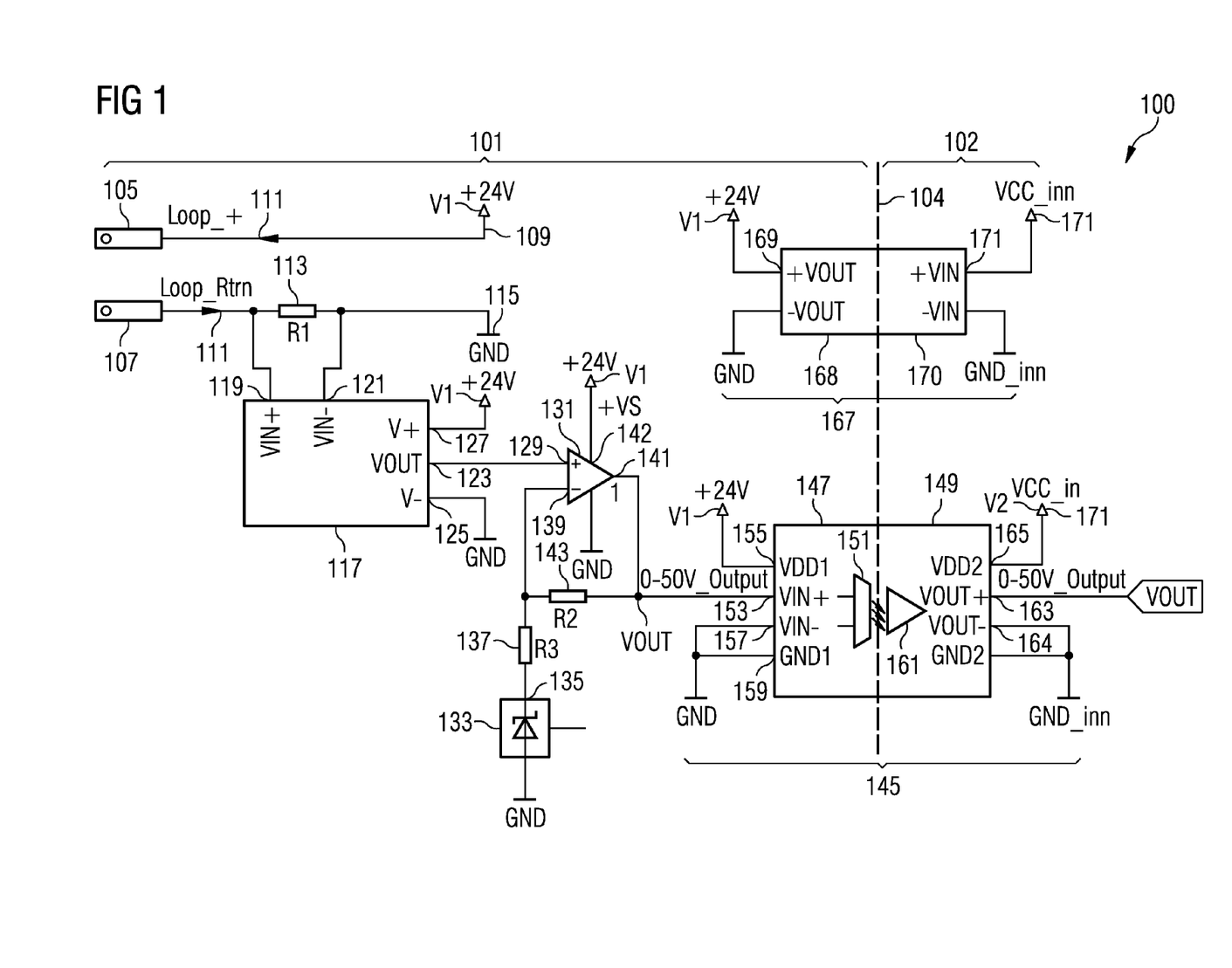
FIG. 1 illustrates a schematic circuit diagram of a converter according to an example embodiment.

FIG. 1 illustrates a schematic circuit diagram of a converter 100 according to an example embodiment. The converter 100 comprises a first region 101 and a second region 102, wherein the first region 101 is galvanically separated (and isolated) from the second region 102 by a border 104 indicating a galvanic separation or galvanic isolation.

A (not illustrated) measuring device may be connected between a first input terminal 105 and a second input terminal 107, wherein the device may be supplied with energy by supplying a first electric supply voltage V1 to a supply terminal 109. The first electric supply voltage V1 may for example be +24 V. An input current 111 may flow through the in FIG. 1 not illustrated device and will return to the second input terminal 107. From the second input terminal 107 the input current 111 flows through a shunt resistor 113 to an input reference node 115, which is in the illustrated embodiment connected to a ground potential GND. The input current 111 flowing through the not illustrated device may be indicative of a measurement value of a physical quantity measured by the device.

A first amplifier 117 which may be also considered as a current shunt monitor may receive a voltage drop at input terminals 119, 121 of the first amplifier 117. The amplifier 117 amplifies the voltage drop received at its input terminals 119 and 121 and outputs a preliminary output voltage at its output terminal 123 relative to a reference output terminal 125 which is connected to the ground potential GND. Herein, the first amplifier 117 is provided with electrical energy using the supply input terminal 127. For example, the first amplifier 117 is supplied with electric energy employing the first electric supply voltage V1 which is also supplied to the supply terminal 109.

The preliminary output voltage output at terminal 123 of the first amplifier 117 is supplied to a plus input terminal 129 of a second amplifier 131. The second amplifier 131 is or comprises an operational amplifier. A portion of the preliminary output voltage output provided at the output terminal 123 of the first amplifier 117 corresponds to a standby current for operating the device connected between the first input terminal 105 and the second input terminal 107, wherein this portion of the preliminary output voltage does not correspond to a signal being indicative of a measurement value of the physical quantity. For example, the preliminary output voltage supplied at the output terminal 123 of the first amplifier 117 may not be zero, even if the physical quantity to be measured has a zero value.

For correcting for this undesired voltage offset the converter 100 comprises a voltage reference element 133 which provides an offset voltage at its output terminal 135 which is supplied via a resistor 137 to the minus input terminal 139 of the second amplifier 131. Further, an output terminal 141 of the second amplifier 131 is connected via another resistor 143 to the minus input terminal 139 of the second amplifier 131. The second amplifier 131 is adapted to provide at its output terminal 141 the output voltage VOUT in the range between 0 and 5 V. In other embodiments the output voltage may be provided as a digital output voltage signal.

The converter 100 further comprises a voltage transfer component 145 comprising a first circuit 147 in the first region 101 and comprising a second circuit 149 located in the second region 102.

In the illustrated embodiment the first circuit comprises a light source 151 which generates light of an intensity, wherein the intensity depends on the input voltage VOUT received at the input terminal 153. For supplying the first circuit 147 with electric energy the supply terminal 155 is supplied with electric energy by employing a first electric supply voltage V1. For example, the first circuit 147 does not require for proper operation an energy stream employing a positive voltage and a negative voltage relative to the ground potential GND to which the terminals 157 and 159 are connected.

The light source 151 generates light having an intensity which is based on the output voltage VOUT received at the input terminal 153 of the first circuit. The light generated by the light source 151 travels across the border 104 towards a photodiode 161 comprised in the second circuit 149. Based on an intensity of light received by the photodiode 161 the second circuit 149 generates an output voltage VOUT at its output terminal 163. For driving the second circuit the second circuit 149 receives electric energy at a supply terminal 165. Thereby, a second electric supply voltage V2 is applied at the supply terminal 165.

For supplying the first electric supply voltage V1 to the supply terminal 109, to the supply terminal 127 of the first amplifier 117, to the supply terminal 155 of the first circuit 147, and also to the supply terminal 142 of the second amplifier 131 the converter 100 comprises an electric power provider 167 for providing the first electric supply voltage V1 at its supply terminal 169. The first electric supply voltage V1 may for example be +24 V. It should be understood that the electric power provider 167 does not provide a voltage additional to the first electric supply voltage which has a different polarity than the first electric supply voltage V1. Thus, the electric power provider 167 may be considered as a single-polarity electric power provider.

For example, the electric power provider 167 receives electric energy from an external device via a power input terminal 171. Thereby, the second electric supply voltage V2 may be applied to the power input terminal 171 using the external device or system. Further, the electric power provider 167 comprises a first provider portion 168 located within the first region 101 and a second power provider portion 170 located in the second region 102. Herein, the first power provider portion 168 and the second power provider portion 168 are inductively coupled for transferring the electric energy from the second power provider portion 170 to the first power provider portion 168.

Figure 2:
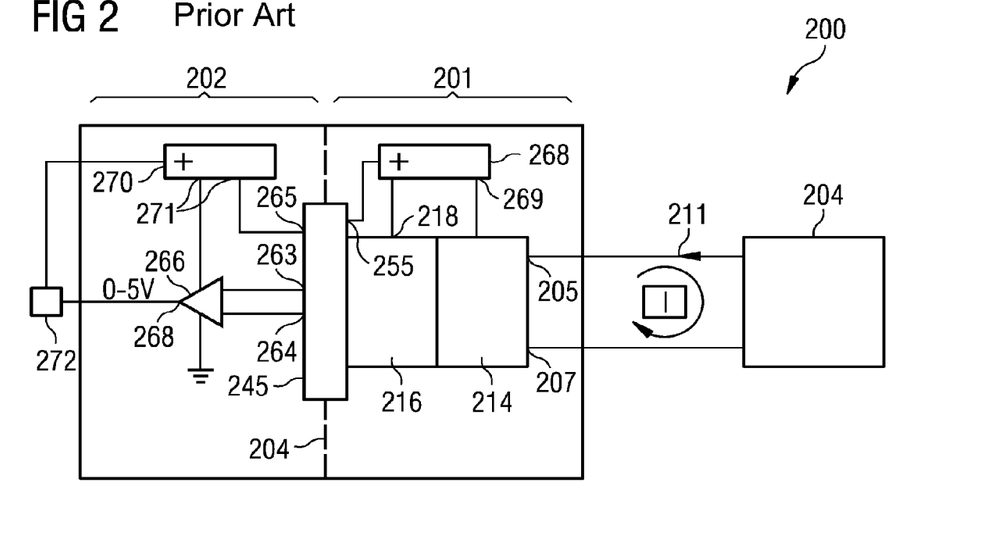
FIG. 2 illustrates in a schematic form a converter according to an example embodiment, wherein a field transmitter is connected to the converter and a control system is connected to the converter.

FIG. 2 schematically illustrates a converter 200 according to an embodiment to which a measuring device 204 is connected between the first input terminal 205 and the second input terminal 207 and to which a control system 272 is connected at an output terminal 268. Within the 4-20 mA receiver 214 the input current 211 is received, wherein the receiver 214 is supplied with electrical energy using the first electric power provider portion 268, which provides a supply voltage of a single polarity via the supply terminal 269. Further, a current to voltage converter 216 converts the current 211 to a voltage, such as the output voltage VOUT. For example, the current to voltage converter 216 may comprise the shunt resistor 113, the first amplifier 117, the second amplifier 131, the reference voltage element 133 and the resistors 137 and 143, as illustrated in FIG. 1.

Further, the converter 200 illustrated in FIG. 2 comprises the voltage transfer component 245 which may be similarly constructed as the voltage transfer component 145 illustrated in FIG. 1. For example, the voltage transfer component 245 is supplied with electric energy using the single-polarity power supply provider 268 via the supply terminal 255. Also the current to voltage converter 216 is provided with a single-polarity voltage at a terminal 218.

Further, the voltage transfer component 245 is supplied with electrical energy from the second region 202 using the second power provider portion 270, wherein the second power provider portion provides the electrical energy via the supply terminal 271, 265.

The voltage transfer component 245 provides at output terminals 263 and 264 the output voltage VOUT or a scaled version thereof to an additional amplifier 266 which generates the final output voltage VOUT at its output terminal 268.

According to an embodiment, the operational amplifier 266 may also be provided in the embodiment 100 illustrated in FIG. 1. Further, the amplifier 266 is supplied with electric energy using the second power provider portion 270 via the supply terminal 271.

Figure 3:
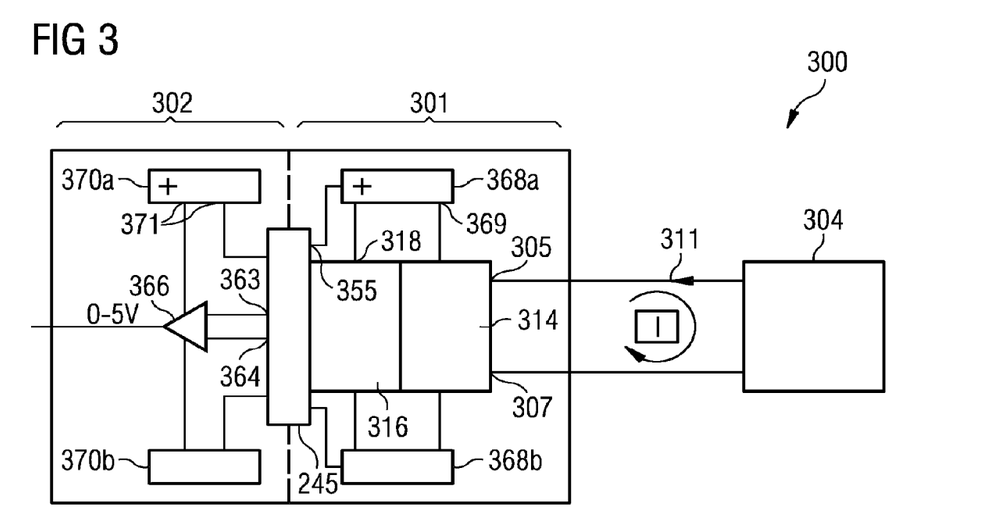
FIG. 3 illustrates in schematic form a conventional converter.

FIG. 3 schematically illustrates a converter 300 according to a conventional example. In contrast to the converter 200 according to an embodiment, illustrated in FIG. 2, the converter 300 requires in the first region 301 two first power provider portions 368a and 368b to provide electrical energy to the components within the first region 301 employing voltages of two opposite polarities, wherein the first power provider portion 368a provides a positive polarity of a supply voltage and the other first power provider portion 368b provides a negative polarity supply voltage.

Further, the converter 300 according to the conventional example also comprises within the second region 302 two second power provider portions 370a and 370b, wherein the second power provider portion 370a provides a positive polarity supply voltage and the other second power provider portion 370b provides the negative polarity supply voltage for supplying the components within the second region 302 with electric energy. Thereby, the converter 300 according to the conventional example requires more space, is heavier and thus more expensive than the converters 100 or 200 according to embodiments disclosed herein.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

What is claimed is:

1. Converter for converting an input current to an output voltage, the converter comprising:
   a first region;
   a second region galvanically separated from the first region;
   an input reference node in the first region, wherein the converter is configured to allow a flow of the input current through a device to the input reference node;
   circuitry configured to generate, based on the input current, the output voltage relative to an output reference electric potential, wherein the circuitry comprises a voltage transfer component for transferring the output voltage from the first region to the second region, wherein the voltage transfer component comprises a first circuit in the first region and a second circuit in the second region, and wherein the first circuit is driven by a first electric supply voltage relative to a first supply reference potential;
   an output terminal located in the second region and connected to the second circuit for outputting the output voltage;
   an electric power provider for providing the first electric supply voltage relative to the first supply reference potential for driving the first circuit; and
   a power input terminal in the second region, wherein the electric power provider is adapted to receive electrical energy via the power input terminal.

2. Converter of claim 1, wherein the first supply reference potential is a ground potential.

3. Converter of claim 1, wherein the electric power provider comprises a DC power provider.

4. Converter of claim 1, wherein the electric power provider comprises a first power provider portion in the first region and a second power provider portion in the second region, wherein the first power provider portion is inductively or capacitively coupled to the second power provider portion.

5. Converter of claim 4, wherein the second power provider portion is configured to receive the electrical energy via the power input terminal, and wherein the first power provider portion and the second power provider portion are configured to transfer the electrical energy from the second power provider portion to the first power provider portion.

6. Converter of claim 1, wherein the second circuit is configured to receive electric power via the power input terminal, wherein the electric power is supplied employing a second electric supply voltage relative to a ground potential.

7. Converter of claim 1, wherein the second circuit is inductively, optically, or capacitively coupled to the first circuit.

8. Converter of claim 1, wherein the converter is adapted to supply electric energy to the device and convert the input current in a predetermined input current range between 0 mA and 20 mA, to an output voltage in a predetermined output voltage range between 0 V and 5 V, relative to a ground potential.

9. Converter of claim 1, further comprising:
   a first input terminal and a second input terminal for connecting the device between the first input terminal and the second input terminal, wherein the first input terminal and the second input terminal are located in the first region, and
   wherein the first input terminal and the second input terminal allow a flow of the input current from the first input terminal through the device to the second input terminal and from the second input terminal to the input reference node.

10. Converter of claim 9, further comprising:
    a shunt resistor connected between the second input terminal and the input reference node, wherein the output voltage is based on a voltage drop across the shunt resistor upon flow of the input current through the shunt resistor.

11. Converter of claim 10, further comprising:
    a first amplifier configured to amplify the voltage drop to a preliminary output voltage, wherein the output voltage is based on the preliminary output voltage.

12. Converter of claim 11, further comprising:
    a second amplifier configured to generate the output voltage based on the preliminary output voltage, wherein the second amplifier is adapted to generate the output voltage such that the output voltage is zero, if the input current has a predetermined current value, and wherein the second amplifier is adapted to generate the output voltage to be proportional to a difference of the input current and the predetermined current value.

13. Arrangement, comprising:
   a measuring device providing an electric current based on a measuring value of a physical quantity;
   a converter for converting an input current to an output voltage, the converter comprising:
      a first region;
      a second region galvanically separated from the first region;
      an input reference node in the first region, wherein the converter is configured to allow a flow of the input current through a device to the input reference node;
      circuitry configured to generate, based on the input current, the output voltage relative to an output reference electric potential, wherein the circuitry comprises a voltage transfer component for transferring the output voltage from the first region to the second region, wherein the voltage transfer component comprises a first circuit in the first region and a second circuit in the second region, and wherein the first circuit is driven by a first electric supply voltage relative to a first supply reference potential; and
      an output terminal located in the second region and connected to the second circuit for outputting the output voltage,
   wherein the measuring device is connected between a first input terminal and a second input terminal of the converter, the first and second input terminals being located in the first region, and
   wherein the first input terminal and the second input terminal allow a flow of the input current from the first input terminal through the device to the second input terminal and from the second input terminal to the input reference node; and
   a control system for supplying electric energy to the converter via a power input terminal and receiving the output voltage from the converter via the output terminal.

14. The arrangement of claim 13, wherein the converter further comprises:
   a shunt resistor connected between the second input terminal and the input reference node, wherein the output voltage is based on a voltage drop across the shunt resistor upon flow of the input current through the shunt resistor.

15. The arrangement of claim 14, wherein the converter further comprises:
   a first amplifier configured to amplify the voltage drop to a preliminary output voltage, wherein the output voltage is based on the preliminary output voltage.

16. The arrangement of claim 15, wherein the converter further comprises:
   a second amplifier configured to generate the output voltage based on the preliminary output voltage, wherein the second amplifier is adapted to generate the output voltage such that the output voltage is zero, if the input current has a predetermined current value, and wherein the second amplifier is adapted to generate the output voltage to be proportional to a difference of the input current and the predetermined current value.

17. Converter for converting an input current to an output voltage, the converter comprising:
   a first region;
   a second region galvanically separated from the first region;
   an input reference node in the first region, wherein the converter is configured to allow a flow of the input current through a device to the input reference node;
   circuitry configured to generate, based on the input current, the output voltage relative to an output reference electric potential, wherein the circuitry comprises a voltage transfer component for transferring the output voltage from the first region to the second region, wherein the voltage transfer component comprises a first circuit in the first region and a second circuit in the second region, and wherein the first circuit is driven by a first electric supply voltage relative to a first supply reference potential;
   an output terminal located in the second region and connected to the second circuit for outputting the output voltage;
   wherein the converter is adapted to supply electric energy to the device and convert the input current in a predetermined input current range between 0 mA and 20 mA, to an output voltage in a predetermined output voltage range between 0 V and 5 V, relative to a ground potential.

* * * * *